US006950595B2

(12) United States Patent
Maestle

(10) Patent No.: US 6,950,595 B2

(45) Date of Patent: Sep. 27, 2005

(54) OPTICAL ATTENUATOR WITH HEAT COMPENSATION

(75) Inventor: Ruediger Maestle, Böblingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 155 days.

(21) Appl. No.: 10/455,890

(22) Filed: Jun. 6, 2003

(65) Prior Publication Data

US 2004/0033046 A1 Feb. 19, 2004

(30) Foreign Application Priority Data

Jul. 5, 2002 (EP) ............................................ 02015037

(51) Int. Cl.[7] .................................................. G02B 6/00

(52) U.S. Cl. ...................................................... 385/140

(58) Field of Search ................................ 359/885–892; 385/140

(56) References Cited

U.S. PATENT DOCUMENTS

| | | | | |
|---|---|---|---|---|
| 3,746,429 A | | 7/1973 | Spindel et al. | 350/266 |
| 5,144,498 A | * | 9/1992 | Vincent | 359/885 |
| 5,325,459 A | | 6/1994 | Schmidt | 385/140 |
| 5,335,245 A | | 8/1994 | Marie et al. | 372/103 |
| 5,726,797 A | | 3/1998 | Zhang et al. | 359/350 |
| 6,085,002 A | * | 7/2000 | Qiu et al. | 385/52 |
| 6,778,337 B2 | * | 8/2004 | Aoki et al. | 359/738 |
| 2002/0154428 A1 | * | 10/2002 | Nasu et al. | 359/892 |

FOREIGN PATENT DOCUMENTS

| | | |
|---|---|---|
| EP | 0165015 A2 | 12/1985 |
| EP | 0921419 A1 | 6/1999 |
| EP | 0994370 A2 | 4/2000 |

OTHER PUBLICATIONS

CRC Handbook of Chemistry and Physics, 78th Edition, 1997–1998, pp. 12–196 & 12–197.
Patent Abstracts of Japan—Publication No. 10101486.
Patent Abstracts of Japan—Publication No. 61133682.
Patent Abstracts of Japan—Publication No. 08201604.
Patent Abstracts of Japan—Publication No. 08029252.

* cited by examiner

*Primary Examiner*—Rodney Bovernick
*Assistant Examiner*—Omar Rojas

(57) ABSTRACT

An attenuating device for attenuating optical power of a light beam, comprises an at least partly absorbing element adapted to receive and attenuate the optical power of the light beam, and a supporting element for supporting on at least one side the at least partly absorbing element. The at least partly absorbing element comprises at least one layer coated or evaporated on the supporting element with an increasing, decreasing, or varying thickness. The supporting element is provided with a material having a crystalline structure to provide compensation to a local heating in the at least partly absorbing element resulting from absorption of the light beam.

12 Claims, 1 Drawing Sheet

11
15
12
13
16
17
19
21
23
25
29

OPTICAL ATTENUATOR WITH HEAT COMPENSATION

BACKGROUND OF THE INVENTION

The invention relates to an optical attenuator for attenuating the intensity of a light beam.

U.S. Pat. No. 5,325,459 discloses an optical attenuator comprising a supporting element and a partly absorbing element attached on the supporting element. The supporting element is provided with a quartz glass (e.g. BK7 available form the company Schott) coated with a metallic partly absorbing coating.

SUMMARY OF THE INVENTION

It is an object of the invention to provide an improved optical attenuator. This object is solved by the independent claims and preferred embodiments are shown by the dependent claims.

When attenuating intensity of a light beam, a large amount of energy might have to be dissipated at least out of the zone impinged by the light beam. According to the invention, the optical attenuator comprises a supporting element providing compensation to local heating in the at least partly absorbing element. Therefore, the maximum temperature caused by partly absorbing the light beam will be reduced. This allows to use the optical device for high power application. Furthermore, damages, remaining deflection, changes of optical properties due to a local heating can be avoided.

In contrast to the prior art attenuators, wherein the course of the temperature curve with respect to a cross section of the supporting element is like a Gaussian distribution with a distinct maximum, the course of the temperature curve in the inventive supporting element can be provided in a small temperature range without any reasonable maximum. The heating of the supporting element can be provided almost uniform. Therefore, temperature gradient between the supporting element and the absorbing element can be provided to be low.

The supporting element is made of a crystalline structure, which enables dissipating a large amount of energy. The crystalline structure is preferably provided with at least one orientation in the space having a preferred thermal conductivity for detaching the large amount of energy. Thus, the local heating at least in the zone of the optical device impinged by the optical light beam can be reduced.

For example, the supporting element is preferably made of mono- or polycrystalline materials such as $SiO_2$, modifications of $SiO_2$, sapphire, silicon, oxide ceramics as well as chlorine or fluorine salt crystals. All those materials have at least one crystal-line structure also having a high thermal conductivity.

In a preferred embodiment of the invention, the heat dissipation of the supporting element will be increased by providing a supporting element with a material having a thermal conductivity $\lambda$ larger than 2 W/mK. In contrast to prior art attenuators, wherein the supporting element is made of amorphous material (e.g. quartz glass) having a maximum thermal conductivity of about 1,5 W/mK, the increase of heat dissipation will be enabled.

Further to a preferred embodiment, the expansion of the supporting element due to the heat is equal or at least partly adapted to the expansion of the absorbing element caused by the absorbed heat. Therefore, the interfacial tension is minimized and the thermal conduction between the absorbing element and the supporting element remain nearly without tension in between.

In a further embodiment the supporting element is made of a material having a high thermal conductivity and a high transmission, in a spectral range of the light beam between 1.2 to 1.7 $\mu$m. Due to this combination of the characteristics the local temperature of the impinging zone will be reduced reciprocal proportional to the thermal conductivity. Thus, a uniform temperature distribution in the optical device will be achieved.

In a further preferred embodiment the supporting element and the absorbing element are substantially independent to the wavelength of an optical signal and therefore widely applicable.

The partly absorbing element comprises at least one layer, preferably a metal layer, coated on the supporting element with varying thickness. Preferable are combined materials of the supporting element and absorbing element having characteristics which assist each other and enable dissipating a large amount of energy.

In a preferred embodiment, the supporting element and the at least partly absorbing element are both positioned preferably identical in position to an optical axis of the elements to optimize the attenuation. Therefore the optical properties can be independent or nearly without any influence from the state of polarisation of the incident beam.

A mapping element is preferably provided on at least one side of the supporting element and at least the partly absorbing element. This enables, for example, if provided on the side of the input beam and the output beam with respect to the optical device to map in a desired way the input beam to the supporting element and the output beam to the output fiber or a transmittive element.

Further according to a preferred embodiment, at least the supporting element is cooled by a cooling device to reduce the temperature of the absorbed energy. The cooling device can be solely or additionally provided with a supporting element having a crystalline structure or a structure with a thermal conductivity of at least 2 W/mK. Since the cooling device can act actively or passively, the dissipation of heat can be increased.

According to a preferred embodiment, the cooling device comprises different components as heat pipes, cooling rips, blow nozzles for cooled air or Peltier-coolers, which can be provided alone or in any combination with respect to the application of the optical device.

The optical attenuator can be provided with an at least partly transmitting supporting element and an at least partly reflecting or attenuating absorbing element for the impinging light beam.

BRIEF DESCRIPTION OF THE DRAWING

Other objects and many of the attendant advantages of the present invention will be readily appreciated and become better understood by reference to the following detailed description when considered in connection with the accompanied drawing. Features that are substantially or functionally equal or similar will be preferred to the same reference sign.

DETAILED DESCRIPTION OF THE PREFERRED EMBODIMENT(s)

Figure 1:
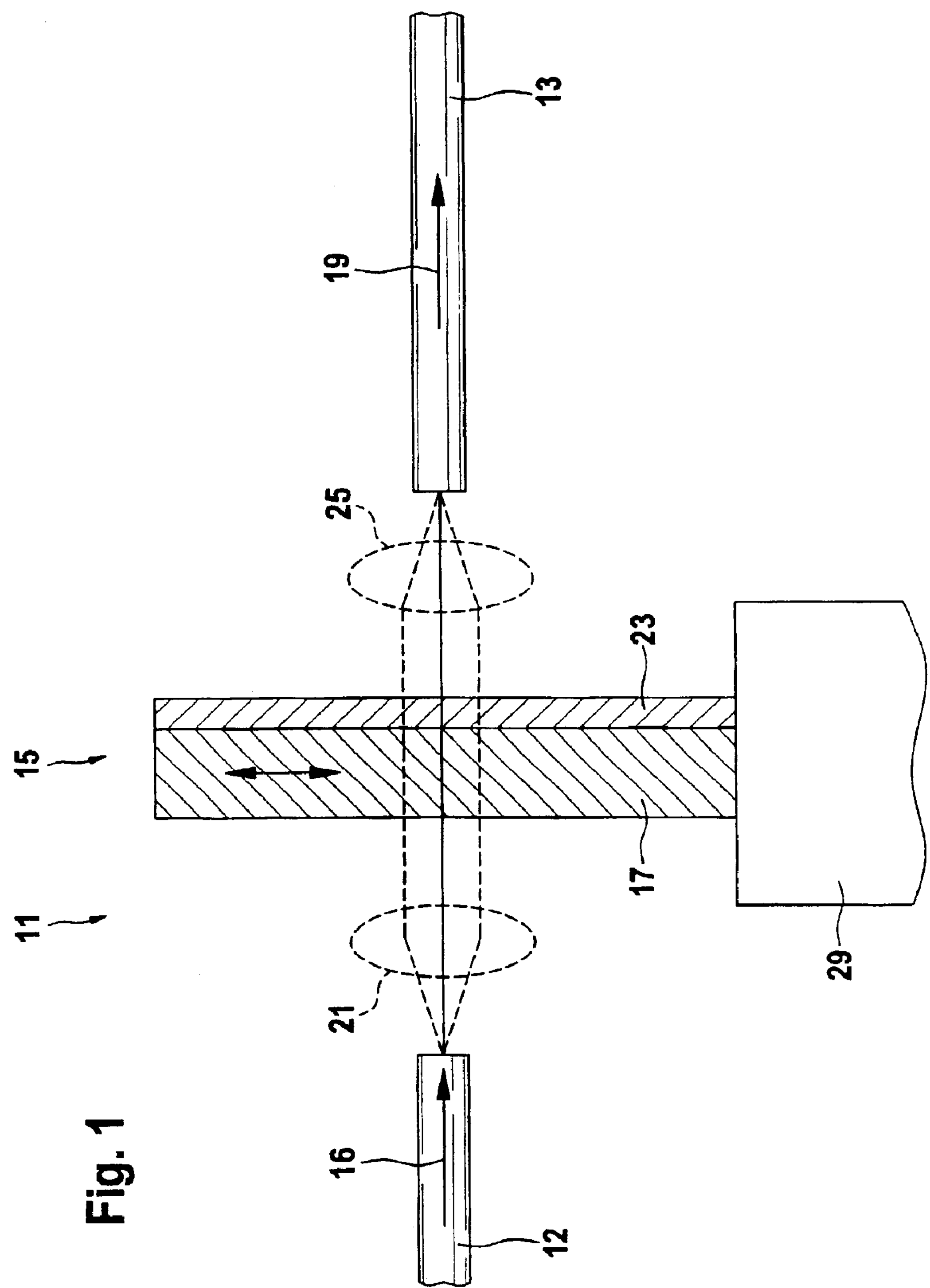
FIG. 1 shows a schematic view of a preferred embodiment of an optical device according to the present invention.

In FIG. 1, an optical attenuator 11 can be coupled between an emitting source 12, e.g. an input fiber and an output fiber 13. A light beam 16 is emitted from the emitting source 12 and is directed to a disk 15 of the optical attenuator 11. Preferably is provided a first lens 21 or a lens system between the emitting source 12 and the disk 15 to convert the light beam 16 into a parallel light. A second lens 25 or a lens system with range to collect the attenuated portion of the light beam 16 is preferably provided and focuses the collected portion as an output beam 19 into the output fiber 13.

The disk 15 comprises a supporting element 17 having a rectangular cross section and a partly absorbing element 23. At least one side of the disc 15 is coated or evaporated with the at least partly absorbing element 23. The at least partly absorbing element 23 comprises preferably at least one metal layer. The at least partly absorbing element 23 can be determined with a constant thickness or with increasing, decreasing and/or varying thickness in different directions.

The shown disc 15 comprising the supporting element 17 and partly absorbing element 23 is not limited to this shape and is described with respect to different shapes and further possibilities for providing the thickness of the partly absorbing material more in detail in the U.S. Pat. No. 5,325,459, to which is hereby referred to. It is further understood, that the shape and the cross sections of the partly absorbing element 23 and the supporting element 17 is not limited to the described embodiments.

According to an exemplary embodiment of the invention the optical device 11 for attenuating the light beams 16 in the spectral range between 1.2 to 1.7 $\mu$m comprises a supporting element 17 made of sapphire, which has substantially uniform attenuation over the spectral range. The refractive index is approximately 1.74 at the respective wavelength and the thermal conductivity is approximately 25 W/mK. Different to prior art, where in the light beam with a power of 2 Watt causes a local over-temperature of 300 K, the present invention achieves reducing the local over-temperature to below 20 K. Thus, changes of the optical properties of the filter will be minimized as well as damaging or destroying the supporting and absorbing element 17, 23 due to thermal overheating will be eliminated.

A further embodiment of the invention is the choice of mono- or polycrystal-line structure such as $SiO_2$, modifications of $SiO_2$, oxide ceramics and chlorine salts and fluor salts. For example, the refractive index of $SiO_2$ is 1.53 at the range of the desired wavelength. The thermal conductivity is in the range between 6.8 to 11.3 W/mK. The properties of the supporting element 17 made of mono- or polycrystalline structures as silicon or similar substrate has e.g. a refractive index 3.48 and the thermal conductivity in the range of 159 W/mK.

The common characteristic of the preferred supporting element 17 is thermal conductivity of at least 2 W/mK and preferably a high rate of transmission, at least in the spectral range between 1.2 to 1.7 $\mu$m.

A cooling device 29 can be attached to the optical element 15. The cooling device 29 is in direct contact at least with the supporting element 17. The cooling device 29 may partly or totally surrounding the optical device 15. According to one embodiment the cooling device is preferably made of a material with a high thermal conductivity as e.g. aluminum or aluminum based alloy. The cooling device 29 may be additionally cooled with a flowable medium as e.g. air.

What is claimed is:

1. An attenuating device adapted for attenuating optical power of a light beam, comprising:

an at least partly absorbing element adapted to receive and attenuate the optical power of the light beam, and a supporting element for supporting on at least one side the at least partly absorbing element, wherein:

optical properties of the supporting element and the absorbing element are substantially independent of a wavelength of the light beam, the at least partly absorbing element comprises at least one layer coated or evaporated on the supporting element with an increasing, decreasing, or varying thickness, and the supporting element comprises a material having a crystalline structure to provide a compensation to a local heating in the at least partly absorbing element resulting from absorption of the light beam.

2. The attenuating device of claim 1, wherein the crystalline structure is a monocrystal- or polycrystalline structure.

3. The attenuating device of claim 1, wherein the supporting element is provided with a material having a thermal conductivity of at least 2 W/mK.

4. The attenuating device of claim 1, wherein the expansion due to heat of the at least partly supporting element is equal or almost equal to that of the absorbing element.

5. The attenuating device of claim 1, wherein the supporting element is made of a material having a high thermal conductivity and a high transmission in the spectral range between a wavelength of 1.2 to 1.7 $\mu$m.

6. The attenuating device of claim 1, wherein the supporting element is provided with a transmittive material and the absorbing element is adapted for attenuating, reflecting or partly reflecting the light beam.

7. The attenuating device of claim 1, wherein the optical axis of the supporting element or the at least partly absorbing element or both are identically positioned relative to an optical axis of the light beam such that the optical properties of the supporting element and the absorbing element are independent or a polarization state of the light beam.

8. The attenuating device according to claim 1, further comprising at least one mapping element arranged for mapping the light beam to the supporting element and the at least partly absorbing element or an output light beam from the supporting element and the at least partly absorbing element to a transmittive element or for mapping the light beam and output light beam to and from the supporting element and the at least partly absorbing element.

9. The attenuating device according to claim 1, wherein the light beam is emitted from an optical input fiber or the output light beam is at least partly coupled into an output fiber or the light beam is at least partly coupled into an output fiber.

10. The attenuating device of claim 1, further comprising a cooling device adapted for cooling the at least partly absorbing element and/or the supporting element.

11. The attenuating device of claim 10, wherein the cooling device comprises at least one of: cooling rips, heat pipes, slow nozzles for cooled air, or Peltier coolers.

12. The attenuating device of claim 10, wherein the cooling device is actively or passively cooled.

* * * * *

UNITED STATES PATENT AND TRADEMARK OFFICE

CERTIFICATE OF CORRECTION

PATENT NO. : 6,950,595 B2
APPLICATION NO. : 10/455890
DATED : September 27, 2005
INVENTOR(S) : Maestle It is certified that error appears in the above-identified patent and that said Letters Patent is hereby corrected as shown below:

Column 4, line 41, claim 7, delete “or” and insert -- of --.

Signed and Sealed this

Twenty-first Day of November, 2006

JON W. DUDAS
*Director of the United States Patent and Trademark Office*